J. W. HOLT.
Artificial-Teeth.

No. 215,924.  Patented May 27, 1879.

WITNESSES:
C. Neveux
C. Sedgwick

INVENTOR:
J. W. Holt
BY Munn & Co
ATTORNEYS.

UNITED STATES PATENT OFFICE.

JOHN W. HOLT, OF GOLDSBOROUGH, NORTH CAROLINA.

IMPROVEMENT IN ARTIFICIAL TEETH.

Specification forming part of Letters Patent No. 215,924, dated May 27, 1879; application filed December 12, 1878.

*To all whom it may concern:*

Be it known that I, JOHN W. HOLT, of Goldsborough, in the county of Wayne and State of North Carolina, have invented new and Improved Artificial Teeth, of which the following is a specification.

This invention relates to an improvement in artificial teeth designed to be pivoted in place; and the object thereof is to provide a socket or pivot-hole in the tooth of sufficient depth and size to enable a strong, permanent, and easily-adjustable connection of the tooth with the root to be made.

It consists in providing each tooth with a metal tube set into it when molded, and then burned in when the tooth is baked, said tube forming a socket or pivot-hole, into which the pivot is entered to connect the teeth with the roots in the gum.

Figure 1:
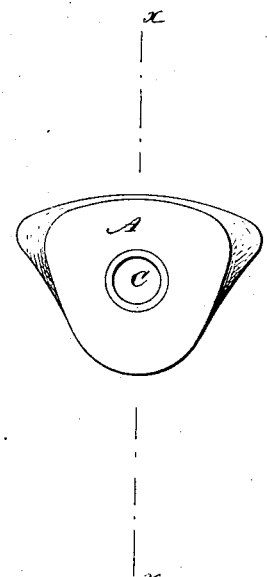
Figure 2:
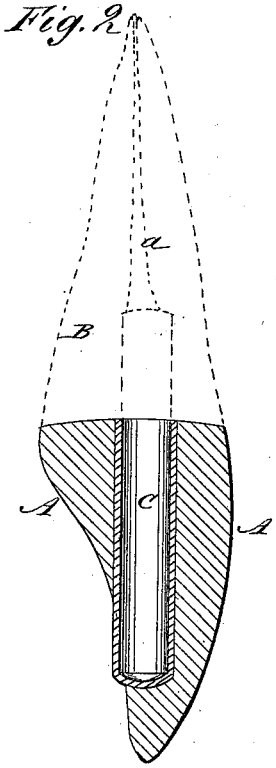

In the accompanying drawings, Figure 1 is a view of the crown of an artificial tooth, showing the metal cylinder; and Fig. 2 is a vertical section of the same on line $x\ x$ of Fig. 1, and showing also the root and manner of attachment.

Similar letters of reference indicate corresponding parts.

Referring to the drawings, A represents the crown of an artificial tooth, made of dentists' porcelain; and B represents the root of a tooth that has been broken off, and exposing the canal $a$. In the middle of tooth A is a metal tube or cylinder, C, of nearly the whole length of the tooth. This forms the pivot-socket or hole, and is made by inserting the metal tube in the tooth when molded, and then burning it in when the tooth is baked, thus forming a permanent socket that can extend to nearly the entire length of the tooth, can be placed in with perfect accuracy of position, and maintains its size, form, and place.

When the tooth is to be inserted the pivot of metal or wood is entered into this tube or cylinder, and it can be made to fit perfectly tight and true without endangering the tooth by forcing or by expansion, as the metal tube retains its shape and guards the porcelain tooth against the pressure of the pivot.

This arrangement, too, enables the artificial tooth to be pivoted to a broken fragment outside the gum as far as the middle of the tooth, as the depth of the metal tube allows it to be ground off to half its length, and still afford sufficient hold for the pivot.

This arrangement will be found to greatly facilitate the operation of pivoting the teeth, and at the same time increase the strength and security of the connection, procure greater accuracy of adjustment, and make the attachment more permanent.

The tube or cylinder C may be made of any metal suitable for dental purposes, and of any desired shape in cross or longitudinal section.

I am aware that the roots of natural teeth have been bushed with metal, and that the usual devices by which artificial teeth are secured to plates have been baked into said teeth; but

What I claim as new and of my invention is—

An artificial tooth in which a tube has been molded and baked, as shown and described.

JOHN WESLEY HOLT.

Witnesses:
W. G. HOLLOWELL,
B. W. SASSER.